(12) United States Patent
Forbes et al.

(10) Patent No.: US 7,458,875 B1
(45) Date of Patent: ***Dec. 2, 2008

(54) LEG MOUNTED TURKEY PAN CALL WITH OPPOSING SOUND PORTS

(75) Inventors: David R Forbes, Cedar Rapids, IA (US); Carman S Forbes, Cedar Rapids, IA (US); Ron M Bean, Cedar Rapids, IA (US)

(73) Assignee: Hunter's Specialties, Inc., Cedar Rapids, IA (US)

( * ) Notice: Subject to any disclaimer, the term of this patent is extended or adjusted under 35 U.S.C. 154(b) by 114 days.

This patent is subject to a terminal disclaimer.

(21) Appl. No.: 11/162,553

(22) Filed: Sep. 14, 2005

Related U.S. Application Data

(60) Continuation of application No. 10/710,942, filed on Aug. 13, 2004, now Pat. No. 6,955,582, which is a continuation of application No. 10/604,377, filed on Jul. 15, 2003, now Pat. No. 6,805,608, which is a division of application No. 09/682,058, filed on Jul. 16, 2001, now Pat. No. 6,616,504.

(51) Int. Cl.
*A63H 5/00* (2006.01)
(52) U.S. Cl. .......................... 446/397; 84/402; 446/418
(58) Field of Classification Search ................... 84/377, 84/378, 402, 411 R, 418, 420; 446/188, 446/199, 207, 208, 209, 213, 214, 215, 216, 446/397, 418, 421
See application file for complete search history.

(56) References Cited

U.S. PATENT DOCUMENTS

| 347,512 | A | * | 8/1886 | Post ........................... 84/418 |
| 2,338,816 | A | * | 1/1944 | Lockhart ................. 84/411 R |
| 3,240,096 | A | * | 3/1966 | Sloan ......................... 84/272 |
| 4,269,104 | A | | 5/1981 | Cantos, Jr. |
| 4,387,531 | A | | 6/1983 | Jacob |
| 4,586,912 | A | | 5/1986 | Adams |
| 4,662,858 | A | | 5/1987 | Hall |
| 4,733,808 | A | | 3/1988 | Turner, Jr. et al. |
| 4,821,932 | A | | 4/1989 | Petryshyn |
| 5,244,430 | A | | 9/1993 | Legursky |
| 5,562,521 | A | | 10/1996 | Butler et al. |
| 5,607,091 | A | | 3/1997 | Musacchia |
| 5,716,254 | A | | 2/1998 | Bowes |
| 6,057,499 | A | * | 5/2000 | Basmadjian ............... 84/411 R |
| 6,095,888 | A | | 8/2000 | Panepinto |
| 6,156,960 | A | * | 12/2000 | Abrams ....................... 84/269 |
| 6,443,803 | B1 | | 9/2002 | Epple, Jr. |
| 6,616,504 | B1 | | 9/2003 | Forbes et al. |
| 6,676,479 | B1 | | 1/2004 | Zimmerman |
| 6,805,608 | B2 | | 10/2004 | Forbes et al. |
| 6,955,582 | B1 | * | 10/2005 | Forbes et al. ................. 446/397 |

* cited by examiner

*Primary Examiner*—John Ricci
(74) *Attorney, Agent, or Firm*—Simmons Perrine PLC

(57) ABSTRACT

A system and method for generating game sounds in a directionally adjustable manner which includes a friction pan call of the type having a circular flat top playing surface and a plurality of holes on generally opposing sides of a substantially cylindrical sound chamber wall, and a method whereby holes or portion of a hole are successively closed in an incremental rotating manner around the call so as to help to create a sound emulating a moving sound source.

20 Claims, 1 Drawing Sheet

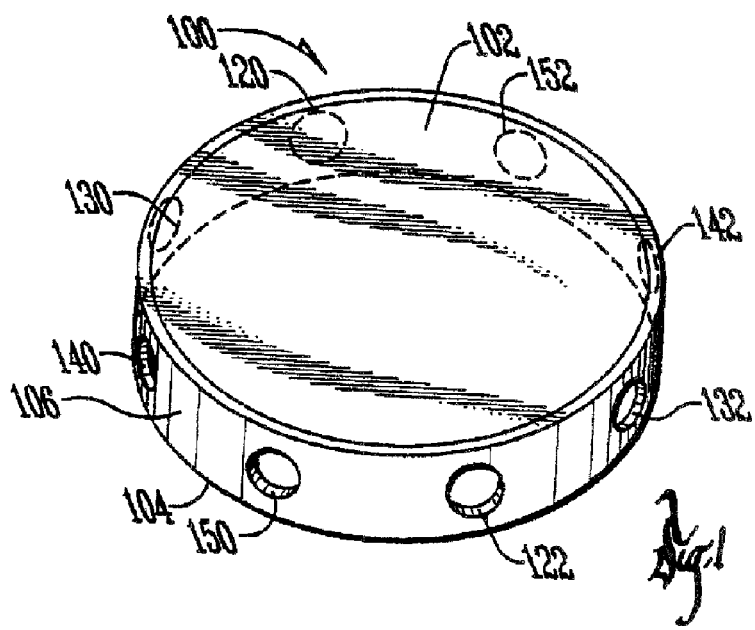
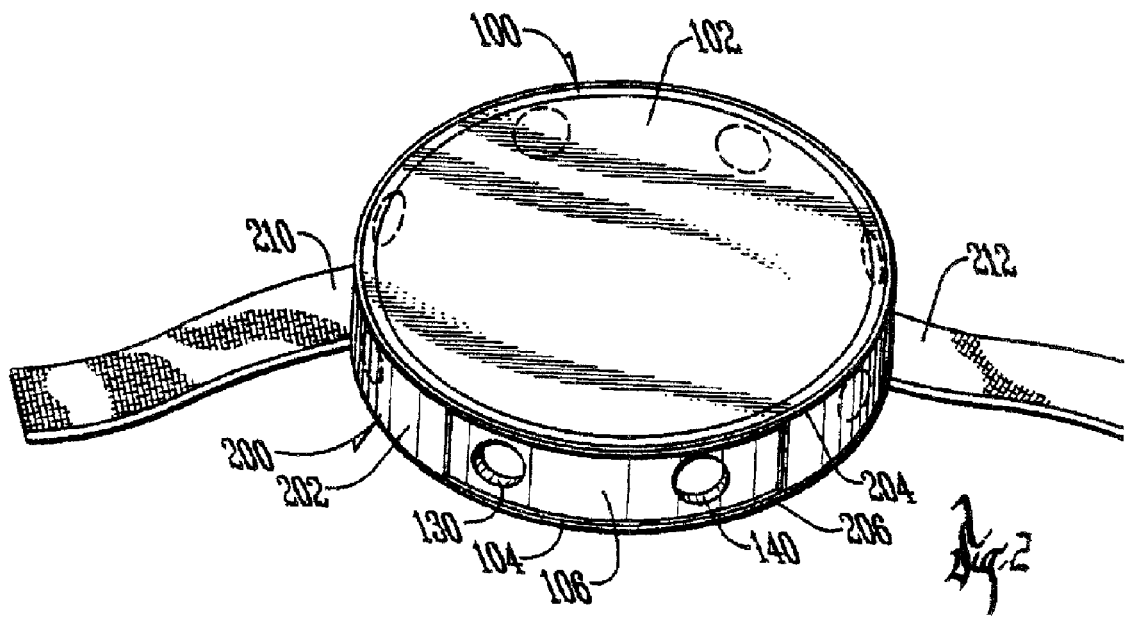

LEG MOUNTED TURKEY PAN CALL WITH OPPOSING SOUND PORTS

CROSS-REFERENCE TO RELATED APPLICATION

This application is a continuation of application Ser. No. 10/710,942 filed on Aug. 13, 2004, and which has now been allowed, which was a continuation of Ser. No. 10/604,377 filed on Jul. 15, 2003, which application has now been allowed and issued as U.S. Pat. No. 6,805,608 B2, and which itself was a divisional of application Ser. No. 09/682,058 filed on Jul. 16, 2001, and now issued as U.S. Pat. No. 6,616,504 entitled "DIRECTIONALLY ADJUSTABLE TURKEY PAN CALL", by the same inventors, which applications and patents are incorporated herein in their entirety by this reference.

FIELD OF THE INVENTION

The present invention generally relates to game calls, and more particularly relates to turkey pan calls, and even more particularly relates to methods and systems for directionally generating a sound.

BACKGROUND OF THE INVENTION

For years, the typical turkey pan call has been a circular friction call with a circular playing surface disposed above a generally cylindrical sound chamber with at least one hole in the bottom from where sound propagates.

While these bottom-holed turkey friction pan calls have been used extensively in the past, they do have some drawbacks. First of all, the hunter often rests the call on the hunter's leg. This tends to attenuate the sound produced by the call. Secondly, a hunter often wants to project the sound in a particular direction. To do this, the hunter would need to tip the call on its side and point the bottom of the call in the desired direction. This makes it difficult to play, because the top playing surface is then vertical.

U.S. Pat. No. 4,387,531 is an example of a call which does not have bottom holes used for sound emission. It does have an open bottom side, but it teaches placing this angled edge against the caller's body for support. The sound is emitted from two holes in the cylinder walls. This call is capable of emitting sound in a side direction, but it does not have the capability for easily changing the direction of the sound emission over a wide range of directions. Because of the slanted bottom opening, it is difficult to change the direction of emission by 45 degrees, 90 degrees, and 180 degrees.

Consequently, there exists a need for improved methods and systems for generating and directionally emitting sounds from a turkey friction pan call in an efficient manner.

SUMMARY OF THE INVENTION

It is an object of the present invention to provide a system and method for direction emission of sound from a turkey friction pan call in an efficient manner.

It is a feature of the present invention to utilize a plurality of sound emitting holes on opposing sides of a generally cylindrical sound chamber.

It is another feature of the present invention to include a plurality of opposing pairs of holes on opposing sides of the call.

It is an advantage of the present invention to achieve improved efficiency, making a full range of sound propagation directions.

The present invention is an apparatus and method for providing directionally adjustable sound emission from a turkey friction pan call, designed to satisfy the aforementioned needs, provide the previously stated objects, include the above-listed features, and achieve the already articulated advantages. The present invention is carried out in a "wasted motion-less" manner in a sense that motion of the call and the caller's hands to achieve a wide range of directional sound motion has been greatly reduced.

Accordingly, the present invention is a system and method including a turkey friction call with a plurality of holes disposed on generally opposite sides of a sound chamber of a turkey friction pan call.

BRIEF DESCRIPTION OF THE DRAWINGS

The invention may be more fully understood by reading the following description of the preferred embodiments of the invention, in conjunction with the appended drawings wherein:

FIG. 1 is a perspective view of a turkey friction pan call of the present invention.

FIG. 2 is a perspective view of a turkey friction pan call of the present invention which includes a "C"-shaped sound blocking ring disposed on the call.

DETAILED DESCRIPTION

Now referring to the drawings wherein like numerals refer to like matter throughout, and more specifically referring to FIG. 1, there is shown a call of the present invention generally designated 100, including a top playing surface 102 which can be any shape but a circular shape is believed to be preferred. The top playing surface is generally disposed during normal use facing upward. Bottom side 104 is on an opposite side of the call 100 from the top side 102. Top side 102, bottom side 104 and sound chamber cylinder wall 106 together form a resonant sound chamber. The prior art calls typically would have holes in the bottom side 104 through which the sound can exit. FIG. 1 shows a plurality of holes 120, 122, 130, 132, 140, 142, 150 and 152 in the sound chamber cylinder wall 106. Holes 120 and 122 are disposed approximately 180 degrees apart as measured around the circumference of the pan call 100. Holes 120 and 122 need not be exactly 180 degrees apart, but if hole 120 is pointed generally in a northerly direction in the field, then hole 122 would be generally in a southerly direction. Similarly, hole pairs 130-132, 140-142, and 150-152 are on generally opposing sides of the call 102. In a preferred embodiment of the present invention, it would be preferred to have at least eight holes disposed around the sound chamber cylinder walls.

Now referring to FIG. 2, there is shown an alternate embodiment of the present invention, which includes a "C"-shaped sound blocking ring 202 disposed around the sound chamber cylinder wall 106. Sound blocking ring 202 preferably can be rotated around the call 100 to select the holes which are blocked and the holes which are left open for sound emission. Sound blocking ring 202 can be a resilient member which merely clips around the sound chamber cylinder wall 106, and it may be disposed between top and bottom circular ridges 204 and 206 respectively. Sound blocking ring 202 may be sufficiently resilient so that a gripping bias force is applied to the sound chamber side wall when the sound ring is disposed thereon.

FIG. 2 also shows a first strap 210 and a second strap 212, which are preferably adapted and configured using Velcro to adhere to each other. Other means of attaching the call 200 to an arm or a leg are envisioned as well, such as buckles, snaps, strings, elastic bands etc.

In operation, the apparatus of the present invention as described in FIG. 1 could function as follows:

The hunter or caller (note: this call could be used by persons other than hunters) holds the call 100 in the palm of one hand. A striker is held in the other hand, and the call is operated in a well-known manner. If none of the holes 120, 122, 130, 132, 140, 142, 150 and 152 are blocked by the caller's hand, then the sound emitted by the call will be omni-directional. However, if the caller wishes the sound to go only in one direction, then the caller need only grasp the call, so that the caller's hands and fingers cover the holes oriented in a direction other than the desired direction of sound propagation.

At times, a caller may want to make a sound of a turkey walking in a large circle pattern. With the aid of the present invention, the caller can grasp the call 100 or even rest the call on the caller's leg, lap or even strap it to a leg or even the caller's arm (or a sleeve disposed around the caller's arm) if sound blocking ring 202 is used. The caller can then make a series of calls or sounds using a striker in the well-known manner, the difference being that the caller may block all but one or two of the holes during the sound generation. With each successive generation of a sound, the caller can switch the open holes to an adjacent hole. This is done by either covering the holes with the fingers or by rotating the sound blocking ring 202. The process is repeated until the sound has been emitted over a wide range of direction, at least 180 degrees. This is all done without any need to move the call itself. More particularly, if a caller first covered all holes except hole 120, then made a sound with the call, then covered all holes except 130 and then made a sound with the call, then the caller covered all holes except 140 and made a sound with the call, it would sound as if the turkey were walking in a counter clockwise direction.

Throughout this description, reference is made to a turkey pan call because it is believed that the beneficial aspects of the present invention would be most readily apparent when used as a turkey call; however, it should be understood that the present invention is not intended to be limited to turkey calls and should be hereby construed to include other non-turkey calls as well.

It is thought that the method and apparatus of the present invention will be understood from the foregoing description and that it will be apparent that various changes may be made in the form, construct steps, and arrangement of the parts and steps thereof, without departing from the spirit and scope of the invention or sacrificing all of their material advantages. The form herein described is merely a preferred exemplary embodiment thereof.

What is claimed is:

1. A method of using a game call;
    providing a smooth flat substantially circular calling surface, with a top side and a bottom side; the top side being provided for interaction with a striker for generation of sound;
    providing a support, comprising a top end and a bottom end, the support being hollow and configured to accept therein some, but not all of any sound originating from the smooth flat substantially circular calling surface;
    providing a pair of sound projecting openings disposed on opposing sides of said support;
    the pair of sound projecting openings being sized and oriented so as to be able to be covered by portions of a human hand;
    providing a sound projecting aperture, disposed within said support, and substantially centrally disposed between said pair of sound projecting openings;
    covering the pair of sound projecting openings so as to inhibit sound from projecting outwardly through said pair of sound projecting openings; and
    striking a striker on the top side so as to generate sound which propagates, in part, downwardly and into the support and causing sound to project through said sound projecting aperture.

2. The method of claim 1 further comprising the step of providing a surface which inhibits sound from projecting out of said bottom end.

3. The method of claim 2 wherein said step of providing a surface further comprises providing a disk-shaped member being free from holes therein affixed to the bottom end.

4. The method of claim 1 wherein the top end has a substantially circular cross-section.

5. The method of claim 4 wherein the top end is secured directly to the smooth flat circular calling surface.

6. The method of claim 1 wherein the support is a sound reflecting hollow member shaped as a uniform cylinder.

7. The method of claim 1 wherein the pair of sound projecting openings have identical shapes.

8. The method of claim 7 wherein the pair of sound projecting openings are completely surrounded by the support.

9. The method of claim 1 wherein the sound projecting aperture is circular in shape.

10. The method of claim 1 wherein the sound projecting aperture is identical in shape to the pair of sound projecting openings.

11. The method of claim 1 wherein said step of covering is accomplished by C-shaped ring.

12. The method of claim 1 wherein the step of covering is accomplished by a portion of a human hand.

13. A game call comprising:
    a disk-shaped flat calling surface, configured to produce wild animal sounds when contacted by a striker;
    a support coupled to the disk-shaped flat calling surface, the support comprising a top end comprising a substantially circular cylinder end; a bottom end and a side wall disposed between the top end and the bottom end;
    the support configured to elevate the disk-shaped flat calling surface above a user's leg;
    the support further configured to reflect sound generated by the disk-shaped flat calling surface;
    the support further sized to provide selective directional projecting of sound through a plurality of openings in the side wall of the support; at least two of said plurality of openings being sized, configured and located so as to be simultaneously covered by a single user's hand; and
    the support further configured to be strapped to the user's leg by coupling a first strap end with a second strap end.

14. The game call of claim 13 wherein a resonant sound chamber comprises all of the space within the support.

15. The game call of claim 13 wherein the side wall forms a circular cylinder.

16. The game call of claim 13 wherein a resonant sound chamber comprises a bottom side opposing the disk-shaped flat calling surface.

17. The game call of claim 13 wherein the plurality of openings are completely surrounded by the side wall.

18. The game call of claim 13 wherein the support comprises a hollow circular cylinder disposed below the disk-shaped flat calling surface.

19. The game call of claim 13 wherein a resonant sound chamber is formed by the disk-shaped flat calling surface, the entire side wall and a bottom side opposing the disk-shaped flat calling surface.

20. A method of using a game call to call wild game, comprising the steps of:

provedinga game call comprising a top playing surface, a support configured to elevate the game call above a user's leg, the support comprising a first sound projecting opening and a second sound projecting opening disposed on opposing sides of the support, a sound projecting aperture disposed centrally with respect to said first sound projecting opening and said second sound projecting opening;

strapping the game call to the user's leg;

repeatedly causing a striker to contact the top playing surface; and thereby generate sounds; and while sound is being generated by contact with the top playing surface, covering the first sound projecting opening and the second sound projecting opening with a user's hand while leaving the sound projecting aperture unobstructed and free to project sound from the support, thereby altering a directional characteristic of sound projecting from the support.

* * * * *